No. 677,438.  
M. T. & M. C. CHAPMAN.  
PUMPING APPARATUS.  
(Application filed Apr. 6, 1894.)  
Patented July 2, 1901.
(No Model.)  
4 Sheets—Sheet 2.
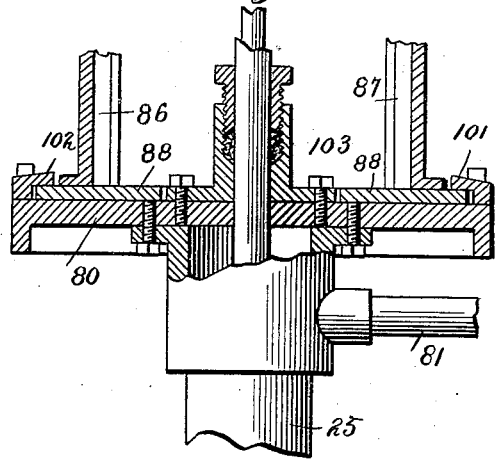
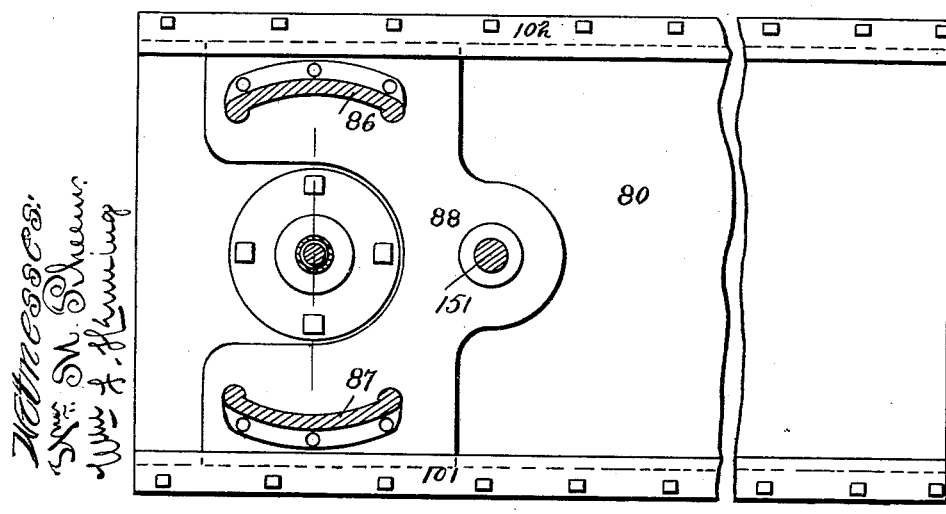

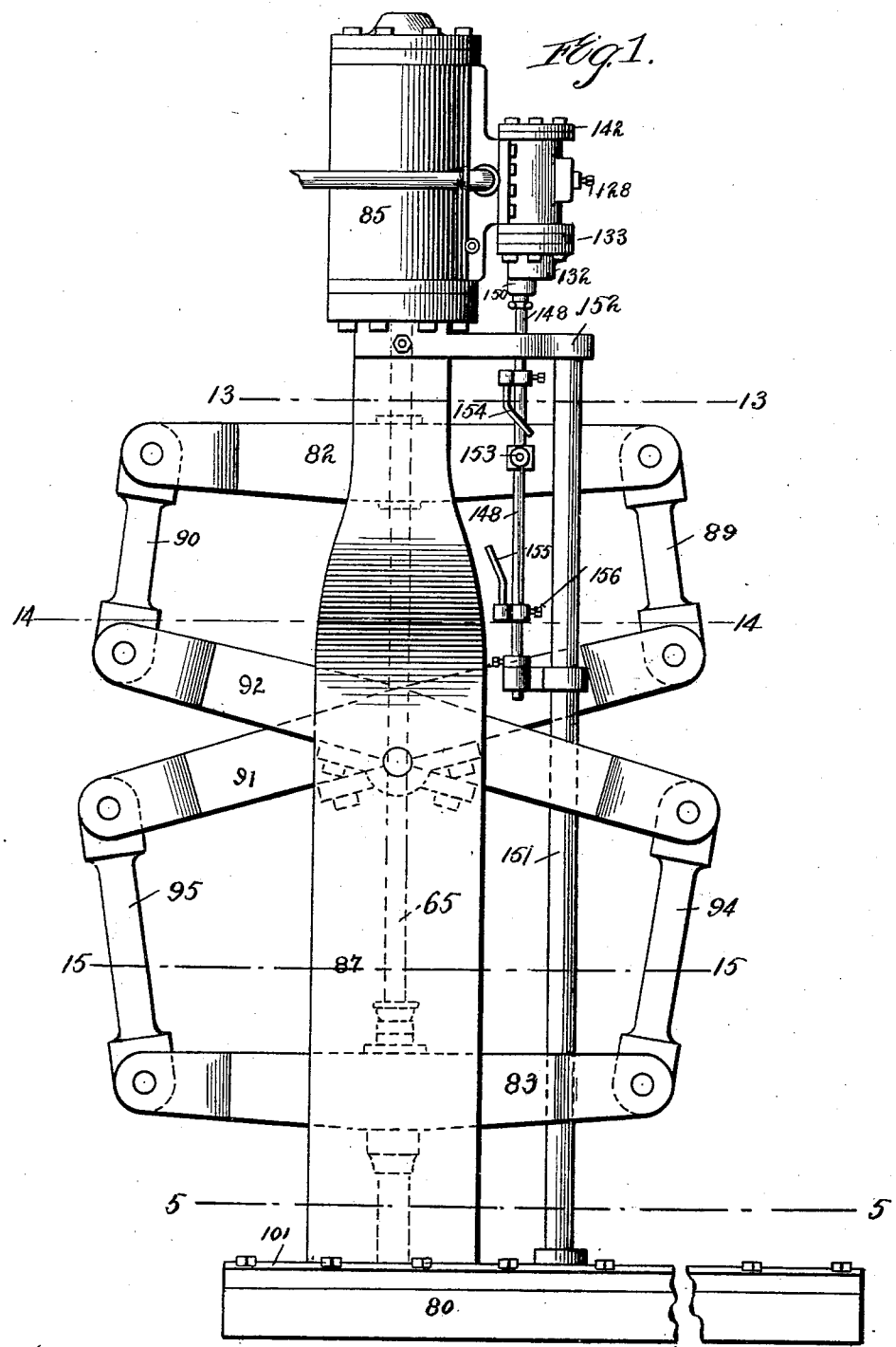

No. 677,438. Patented July 2, 1901.
M. T. & M. C. CHAPMAN.
PUMPING APPARATUS.
(Application filed Apr. 6, 1894.)
(No Model.) 4 Sheets—Sheet 3.
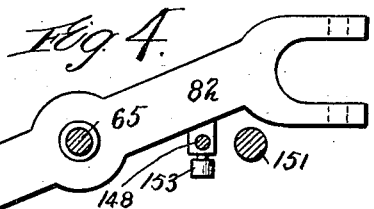
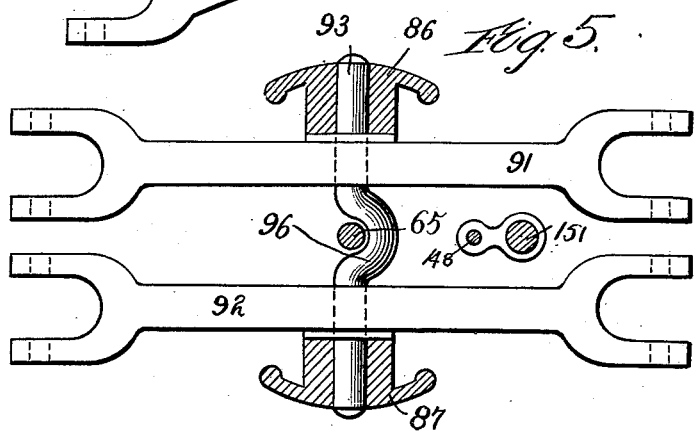
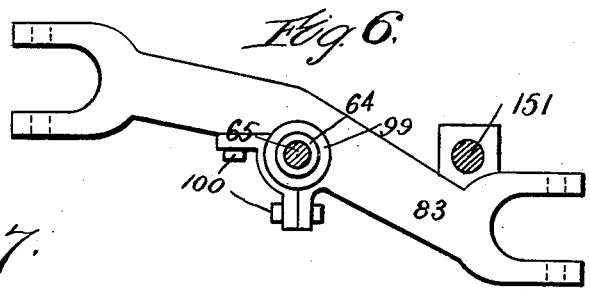
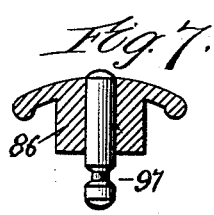
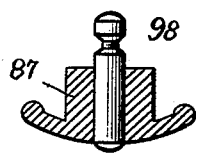
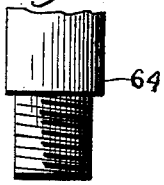
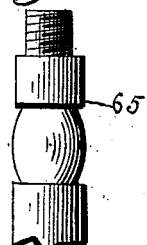
Witnesses:
Wm. M. Rheem
Wm. F. Heming
Inventors
Matthew T. Chapman
Mark C. Chapman
by Bond, Adams, Pickard & Jackson Attys.
THE NORRIS PETERS CO., PHOTO-LITHO., WASHINGTON, D. C.

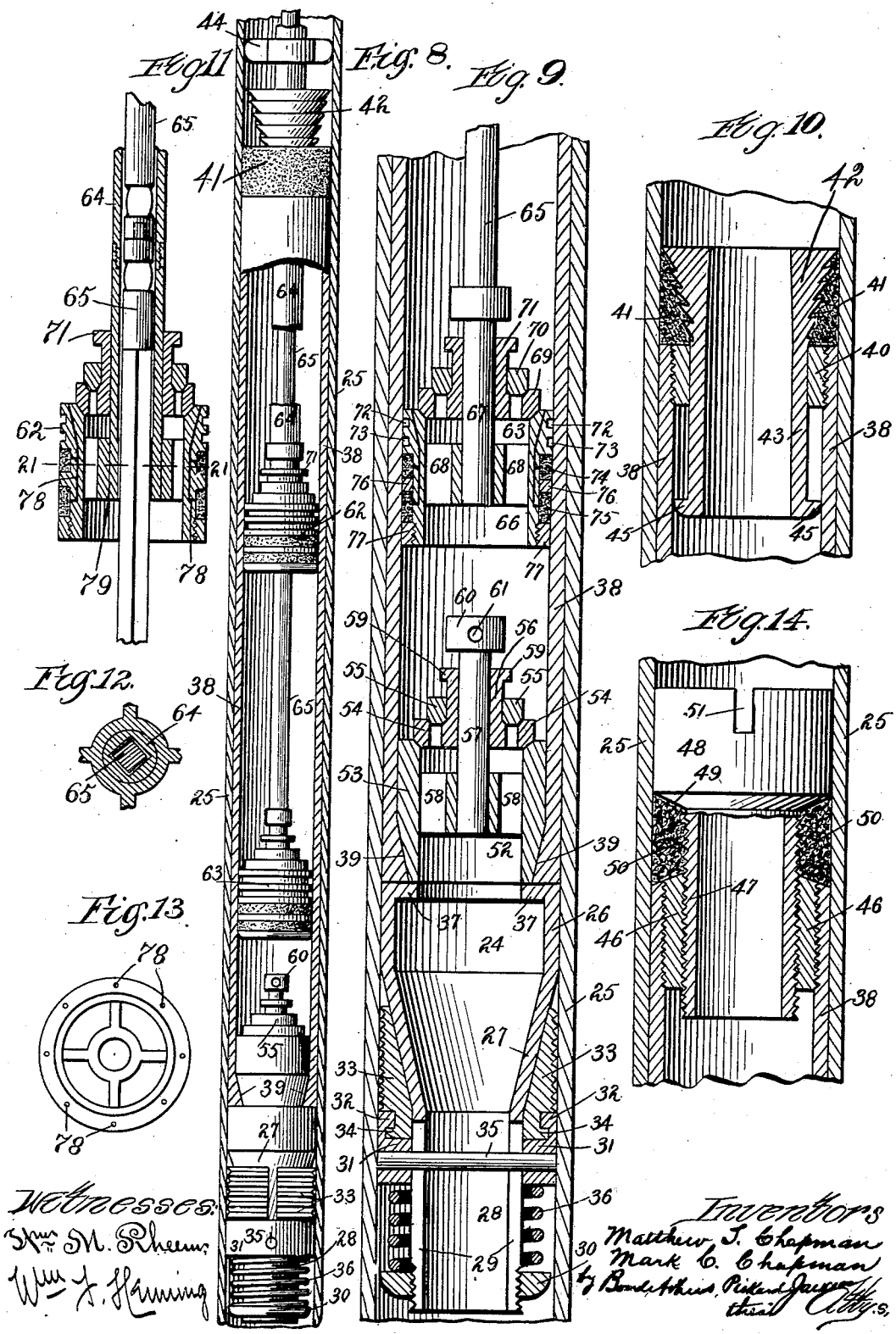

UNITED STATES PATENT OFFICE.

MATTHEW T. CHAPMAN AND MARK C. CHAPMAN, OF AURORA, ILLINOIS.

PUMPING APPARATUS.

SPECIFICATION forming part of Letters Patent No. 677,438, dated July 2, 1901.

Application filed April 6, 1894. Serial No. 506,645. (No model.)

*To all whom it may concern:*

Be it known that we, MATTHEW T. CHAPMAN and MARK C. CHAPMAN, citizens of the United States, residing at Aurora, Kane county, Illinois, have invented certain new and useful Improvements in Pumping Apparatus, of which the following is a specification, reference being had to the accompanying drawings, in which—

Figure 1 is a side elevation of the pumping apparatus. Fig. 2 is a section on line 5 5 of Fig. 1, showing the base-plate which supports the pump-rod-operating mechanism. Fig. 3 is a detail showing the connections of the pipes and the arrangement of the pump-rods and supporting devices at the surface of the ground. Fig. 4 is a horizontal section on line 13 13 of Fig. 1. Fig. 5 is a horizontal section on line 14 14 of Fig. 1, showing the arrangement of the walking-beams. Fig. 6 is a horizontal section on line 15 15 of Fig. 1. Fig. 7 is a detail, being a sectional view showing a modified arrangement of the shaft which supports the walking-beams. Fig. 8 is a vertical section showing the arrangement of the well-tubes and the pumping apparatus which is located therein. Fig. 9 is an enlarged sectional view of the well-tubes and part of the pumping apparatus. Fig. 10 is an enlarged sectional view showing one form of packing the upper end of the inner well-tube. Fig. 11 is a sectional view showing the arrangement whereby the inner and outer pump-rods are locked against rotation. Fig. 12 is a partial cross-section on line 21 21 of Fig. 11. Fig. 13 is a plan view of a portion of one of the plungers. Fig. 14 is a view showing modified apparatus for packing the upper end of the inner well-tube. Fig. 15 is a detail view of the outer or tubular pump-rod, the sections of which are connected by left-hand screw-threads. Fig. 16 is a detail view of the inner or solid pump-rod, the sections of which are connected by right-hand screw-threads.

Our invention relates to pumping apparatus, and particularly to apparatus which is designed primarily for pumping water from deep wells.

It consists in improved means for effecting the reciprocation of the pump-rods and in a new construction whereby the pump-rod-operating devices may be withdrawn from over the well and be disconnected from the pump-rods without necessitating the lifting of the engine and pump-rod-operating devices from over the pump-rods. Furthermore, with regard to the pumping apparatus which is within the well, our invention consists in providing a new and improved method of building up the inside of a well for the purpose of securing an improved action of the plungers and valves which operate within the well, in providing improved plungers and valves, and in providing means whereby the pump or plunger rods will be prevented from becoming disconnected.

Our invention also relates to certain other improvements, all of which will be hereinafter more fully pointed out.

Our improved method of constructing a well consists in placing in the well an exterior tube within which is anchored at a suitable depth a foundation upon which rests an inner well-tube extending to a point near the surface of the ground. Suitable packing is provided at the upper end of the inner tube for the purpose of preventing sand or sediment from working between the inner and outer tubes, and thereby cementing the inner tube in place, so that when desired it cannot readily be removed. With our improved construction, however, all that it is necessary to do when it is desired to remove the inner tube is to remove the packing at its upper end, when the inner tube can readily be withdrawn.

In carrying out the above plan we provide a foundation 24, which is placed within an outer tube 25, as best shown in Figs. 8 and 9. The foundation 24 consists of a cylinder 26, having an intermediate tapering portion 27 and a narrow lower portion 28, as shown in Fig. 9. The narrow portion 28 is provided with slots 29 at diametrically opposite points, as shown. The lower end of the cylinder 26 is screw-threaded to adapt it to receive a collar 30.

31 indicates a collar which is adapted to slide freely upon the lower portion 28 of the cylinder 26, which collar is provided at its upper edge with a circumferential shoulder 32, as best shown in Fig. 9.

33 indicates wedges, the inner surfaces of which are smooth and are adapted to bear upon the inclined portion 27 of the cylinder 26, as shown in Fig. 9. The outer faces of the wedges 33 are serrated or roughened, as shown in Figs. 8 and 9. At their lower ends the wedges 33 are provided with shoulders 34, which are adapted to interlock with the shoulders 32, so that the wedges 33 are held in their proper position and move with the collar 31. The arrangement is such that by moving the collar 31 vertically the wedges 33 may be moved outward or inward.

35 indicates a pin which extends through the slots 29, its ends being secured in the collar 31.

36 indicates a spring which is mounted upon the lower portion of the cylinder 26 between the collars 30 31, its tension serving to separate such collars, thereby separating the wedges 33. The cylinder 26 is provided upon its upper end with an internal flange 37, as best shown in Fig. 9.

When the foundation 24 is to be inserted in the well-tube by means of a suitable tool which straddles the pin 35, the spring 36 is compressed, thereby moving the collar 31 down and permitting the wedges 33 to approach each other. The foundation may then readily be lowered to the desired depth, when by releasing the pin 35 the spring 36 will separate the collars 30 31 and force the wedges into contact with the surface of the tube. Downward pressure upon the foundation 24 serves to further separate the wedges 33 and therefore more tightly lock the foundation in place.

For the purpose of withdrawing the foundation from the well a tool is inserted, which engages the flange 37. By then lifting the cylinder 26 the pin 35 will move down in the slots 29, thereby permitting the wedges to approach each other sufficiently to release the foundation and permit its withdrawal.

38 indicates an inner well-tube, which rests upon the upper portion of the cylinder 26 of the foundation, within which tube operate the plungers by means of which water is elevated to the surface. As shown in Figs. 8 and 9, the lower end of the tube 38 is thickened, forming an internal incline 39. The upper end of the inner tube 38 is internally screw-threaded to receive an internal collar 40, as shown in Fig. 10. Upon the upper end of the tube 38 rests a packing-ring 41, of leather, rubber, or other suitable material.

42 indicates a hollow serrated cone, having a lower cylindrical portion 43, as best shown in Fig. 10. The cone 42 is adapted to be forced down within the packing-ring 41 to forcibly expand said packing-ring, thereby tightly packing the upper end of the inner tube 38. The cone 42 is forced down within the packing-ring 41, preferably by means of a ring 44, secured in the outer pump or plunger rod, as shown in Fig. 8; but any other suitable device may be used. As best shown in Fig. 10, the diameter of the lower cylindrical portion 43 is somewhat less than that of the inner tube 38, and it is provided at its lower edge with a circumferential flange 45, which flange is normally a short distance below the collar 40. The flange 45 serves to prevent the accidental removal of the expanding-cone 42.

When it is desired to remove the packing, the cone 42 is forced upward, either by raising one of the plungers into contact with the lower end of the cylinder 43 or by inserting a suitable tool, which will engage the lower edge of the cylinder 43, when by upward pressure the cone 42 may be forced upward, releasing the packing-ring 41.

In order to remove the packing and pistons without removing the working barrel, the collar 40 is unscrewed, thereby releasing the cylinder 42, with the packing, and providing a free passage for the pistons.

In Fig. 14 we have shown another form of packing for the upper end of the inner tube. As shown in said figure, the upper edge of the inner tube 38 is beveled, and within the upper end of said tube is screwed a collar 46, the upper edge of which is also beveled or inclined. The collar 46 is also internally screw-threaded to receive the lower portion 47 of a packing-cylinder 48. The external diameter of the upper portion of the cylinder 48 is equal to the internal diameter of the outer tube 25, and it is provided with an intermediate inclined portion 49, as shown. Between the inclined face 49 of the cylinder 48 and the upper inclined edges of the tube 38 and collar 46 is placed packing 50, which is compressed and expanded by screwing the cylinder 48 down into the upper end of the tube 38, thereby tightly sealing the upper end of the tube 38. The upper portion of the cylinder 48 is provided with recesses 51, adapted to receive a suitable tool, so that said cylinder may be readily turned either for screwing or unscrewing it.

For the purpose of retaining the water in the lower portion of the tube 38 it is provided in its lower end with a check-valve 52, consisting of a cylinder 53, upon which rest rings 54 55, the upper edges of the cylinder 53 and ring 54 being beveled, and the lower edges of the rings 54 55 being also beveled in order to form water-tight connections. The ring 54 is secured to a sleeve 56, which is adapted to move vertically upon a rod 57, internally secured to the cylinder 53 by suitable webs or plates 58, as shown in Fig. 9, suitable passages being left between the webs 58 to permit of the free passage of water. The ring 54 is connected to the sleeve 56 in a similar manner, so that water may freely pass above the ring 54 when the ring 55 is raised from its seat. The ring 55 is mounted upon the sleeve 56 and is prevented from becoming accidentally displaced by a flange 59 upon the upper edge of said sleeve. The construction of the check-valve is such that when the pump is operating slowly water will pass up within the ring 54 and raising the ring 55 from its seat will pass into the lower portion of the tube 38. When the pump is operated more rapidly, the flow of water is sufficient to raise both rings 54 55 from their seats, the water then passing both inside and outside of the ring 54 and outside of the ring 55, so that a large flow of water through the check-valve is permitted when necessary. The rod 57 is provided at its upper end with a collar 60 and a pin 61, so that said valve may readily be removed by inserting a tool adapted to grasp said pin.

Within the inner tube 38 are two plungers 62 63, the upper plunger 62 being carried by a tubular rod 64, the inner plunger being carried by a solid rod 65, which moves within the rod 64. By mechanism which will be hereinafter described the plungers 62 63 are moved simultaneously in opposite directions, by which arrangement twice as much water is pumped as could be pumped by the use of a single plunger.

The construction of the plungers 62 63 is identical, and it will therefore be necessary to describe only one in detail. The plunger 63 is made up of a cylinder 66, which is connected to a vertical rod 67 by webs 68 and is provided at its upper portion with valve-rings 69 70, the valve-ring 69 having a sleeve 71, upon which moves the valve-ring 70, the sleeve 71 being fitted upon the rod 67, the entire valve arrangement being similar to that of the check-valve above described. The rod 67 is connected to the lower end of the plunger-rod 65. The cylinder 66 is provided with annular recesses 72 73 in its outer surface, as best shown in Fig. 9. The lower portion of the cylinder 66 is turned down so that it is of less diameter than its upper portion and has a screw-threaded portion near its lower end. Upon the turned-down portion of the cylinder 66 is placed packing 74 75 and an intermediate packing-ring 76, the packing being compressed by a collar 77, which is secured upon the lower end of the cylinder 66, as shown in Fig. 9.

78 indicates channels which extend from the upper surface of the cylinder 66 to the turned-down portion of said cylinder, which passages serve to conduct a small amount of water from above the plunger through the body of the plunger to the packing, thereby causing the packing to expand and make the plunger fit more closely in the well-tube.

As best shown in Fig. 11, the outer and inner plunger-rods 64 65 are made up of a number of sections, the sections of each rod being screwed together, the sections of the inner rod 65 being provided with right-hand screw-threads and the sections of the outer rod 64 being provided with left-hand screw-threads. The inner rod is prevented from turning upon its axis independently of the outer rod by means of a sleeve 79, which is secured to one end of the outer rod and is provided with a square or irregular-shaped opening, through which passes a similarly-shaped portion of the inner rod. We prefer to make the opening in the sleeve 79 square and accordingly provide the inner rod with a portion square in cross-section; but any other irregular shape which will prevent rotation of one independently of the other may be used. It is apparent that by this construction the sections of the rods are prevented from becoming disconnected.

As best shown in Fig. 3, the upper end of the well-tube 25 is connected to a plate 80, which rests upon the ground or other suitable support. A pipe 81, which communicates with the upper end of the well-tube, serves to carry off the water.

The pump or plunger rods extend a short distance above the ground and are connected to cross-heads 82 83, the inner rod 65 being connected to the upper cross-head 82 and the outer rod being connected to the lower cross-head 83, as shown in Fig. 1. The upper cross-head 82 is connected at its center to the piston-rod 84 of an engine 85, which engine is supported by suitable standards 86 87, rising from a horizontal plate 88, resting upon the base-plate 80, as shown in Figs. 1, 2, and 3. The cross-head 82 is placed diagonally with reference to the standards 86 87, and its ends are connected by connecting-rods 89 90 to opposite ends of two walking-beams 91 92, respectively, which are pivotally mounted upon a shaft 93, extending between the standards 86 87. The lower cross-head 83 is connected by connecting-rods 94 95 to the other ends of the walking-beams 91 92, as shown in Fig. 1. By this construction the cross-heads 82 83 will always move simultaneously in opposite directions.

As indicated by dotted lines in Fig. 1, the inner plunger-rod 65 passes centrally to the cross-head 82, to which it is connected, and in order not to interfere with such rod the shaft 93 is provided with a bent portion 96, the object of which construction is to permit the operating mechanism to be moved away from the pump-rod without its being lifted high enough to free such rod, as was the case where the shaft 93 has been provided with a central opening, through which the pump-rod 65 passed, a construction heretofore commonly used. Instead, however, of using a bent shaft 93, as shown in Fig. 5, two short shafts 97 98 may be used, as shown in Fig. 7, whereby sufficient space is left between the ends of the shaft to permit of the passage of the rod 65.

For the purpose of releasing the outer plunger-rod 64 for permitting the lower cross-head 83 to be moved away from said rod said cross-head is provided with a detachable portion 99, which forms a part of the bearing of the rod 64, the detachable portion 99 being secured to the cross-head by bolts 100, as shown in Fig. 6.

As best shown in Figs. 2 and 3, the ends of the plate 88 are adapted to move between guides 101 102 at the edges of the base-plate 80, and, as shown, said plate 88 is provided with a U-shaped recess for the passage of the rods 64 65 and a stuffing-box 103, which surrounds said rods, so that such rods will not interfere with the movement of said plate 88, as would be the case if such rods passed through a hole in said plate.

The engine 85 may be of any construction suitable for the purpose; but we prefer an engine such as that described in our application filed July 29, 1895, Serial No. 557,465, which is a division of the present application.

We do not wish to limit ourselves to the specific form of the improvements herein described, as various modifications may be made without departing from the spirit of our invention.

That which we claim as our invention, and desire to secure by Letters Patent, is—

1. The combination with an outer well-tube and an inner well-tube, of a foundation-tube fitted in the outer tube and adapted to support the inner tube, and separately-arranged wedges for locking said foundation-tube in position within the outer well-tube, said wedges being adapted to be operated to lock said foundation-tube in place by the weight of the inner tube, substantially as described.

2. The combination with an outer well-tube, and an inner well-tube, of a foundation-tube fitted in the outer tube and having a conical portion the smaller end of which is lowermost, wedges corresponding to the taper of the conical portion of the foundation-tube and adapted for locking said foundation-tube in position within the outer well-tube, and a spring for forcing said wedges onto the conical portion of the foundation-tube to cause them to separate and fill the space between the foundation-tube and outer well-tube, substantially as described.

3. The combination with a well-tube, and a foundation-tube, the lower end of which is smaller in diameter than the interior of the well-tube, of a collar adapted to move upon the lower portion of said foundation-tube, wedges secured to said collar and adapted to lock the foundation-tube, and a spring under said collar for forcing the wedges upward and outward to bind in the space between the foundation-tube and well-tube, substantially as described.

4. The combination with a well-tube, and a foundation-tube having a conical portion, the lower end of said foundation-tube being smaller in diameter than the interior of the well-tube, of wedges arranged around the smaller part of said foundation-tube and adapted to move upon the conical portion of said tube, and a spring under said wedges for forcing the wedges onto the cone to fill the space between the foundation-tube and the well-tube, substantially as described.

5. The combination with a well-tube, and a foundation-tube having a conical portion, the lower end of said foundation-tube being of smaller diameter than the interior of the well-tube, of wedges adapted to move upon the conical portion of said foundation-tube, a collar upon the lower end of said foundation-tube, and a spring between said collar and said wedges for forcing the wedges onto the cone, substantially as described.

6. The combination with a well-tube, and a foundation-tube having a conical portion, the lower end of said foundation-tube being of smaller diameter than the interior of the well-tube, of wedges adapted to move upon the conical portion of said foundation-tube, a collar upon the lower end of said foundation-tube, a spring between said collar and said wedges for forcing the wedges onto the cone, vertical slots in the lower portion of said foundation-tube, and a pin moving in said slots, substantially as described.

7. The combination with a well-tube, and a foundation-tube having a conical portion terminating in a lower end which is of smaller diameter than the interior of the well-tube, of a collar adapted to move upon the lower portion of said foundation-tube, wedges secured to said collar and adapted to move upon the conical portion of said foundation-tube, a collar adjustable upon the lower end of said foundation-tube, and a spring between said two collars for the purpose of forcing the wedges onto the cone, substantially as described.

8. The combination with a well-tube, and a foundation-tube having a conical portion, the lower end of said foundation-tube being of smaller diameter than the interior of the well-tube and provided with vertical slots, of a collar adapted to move upon the lower portion of said foundation-tube, wedges secured to said collar and adapted to move upon the conical portion of said foundation-tube, a collar adjustable upon the lower end of said foundation-tube, a spring between said two collars for the purpose of forcing the wedges onto the cone, and a pin secured to said first-mentioned collar and moving in the vertical slots of the lower end portion of the foundation-tube, substantially as described.

9. The combination with outer and inner well-tubes, said inner tube having a removable internal collar secured thereto at its upper end, of packing above said collar and inner tube, and a hollow cone for expanding said packing, substantially as described.

10. The combination with outer and inner well-tubes, said inner tube being imperforate and having an internal collar in its upper end, of packing above said collar and inner tube, and a hollow cone adapted to be forced downward for the purpose of expanding said packing, said cone having an external shoulder, substantially as described.

11. The combination with inner and outer well-tubes, of packing for the upper portion of said inner tube, a hollow cone for expanding said packing, said cone having an elongated part extending into the inner tube, an external shoulder on said elongated part, and a collar secured to the upper part of said inner tube, substantially as described.

12. The combination with inner and outer well-tubes, and packing for the upper portion of said inner tube, of a hollow cone for expanding said packing, said cone having an elongated part extended into said inner tube, a collar secured in the upper end of said inner tube, a shoulder upon the lower end of the elongated part of the cone, a valve-rod, and a plunger carried thereby, substantially as described.

13. The combination with a well-tube, plunger-rods, and a plunger-operating engine, of a sliding plate or engine-support adapted to be moved over the well-tube and having a recess for the passage of the plunger-rods, said recess being open at one side to permit movement of the engine away from over the well, pivotally-mounted walking-beams, horizontal pivots for said beams, said pivots being at diametrically opposite sides of the plunger-rods, and being arranged to provide a passage for one of the plunger-rods corresponding to the recess in said sliding plate, whereby movement of the pump-operating mechanism to one side of the well is permitted without removal of the pumping-rods, substantially as described.

14. The combination with a well-tube and pump-rods, of walking-beams, a shaft on which said beams are pivoted, said shaft having a central recess or bend for the passage of one of the pump-rods and to permit lateral movement of the two-plunger-pump-actuating mechanism away from the pump-rods and from over the well without removal of said rods, a plate supporting the engine, said plate being adapted to move over the well, and having a recess corresponding to the recess in said shaft, substantially as described.

15. The combination with a well-tube, plunger-rods, and a plunger-operating engine, of a sliding plate or engine-support adapted to be moved over the well-tube and having a recess for the passage of the plunger-rods, said recess being open at one side to permit movement of the engine from over the well, pivotally-mounted walking-beams, horizontal pivots for said beams, said pivots being at diametrically opposite sides of the plunger-rods and being arranged to provide a passage for one of the plunger-rods corresponding to the recess in said sliding plate, upper and lower cross-heads connected to said walking-beams, the lower cross-head having a removable section in line with the recess in said sliding plate and the passage between the pivots of the walking-beams, whereby the pump-operating mechanism may be moved to one side of the well without the removal of the plunger-rods, substantially as described.

16. The combination with the well-tubes, the pump-rods, and the upper and lower cross-heads, of a two-plunger pumping-engine having walking-beams, such as 91, 92, connected with said cross-heads, and a crank-shaped shaft for said walking-beams approximately perpendicular to the pump-rods but having a central bend for permitting lateral movement of the engine to one side from over a well, to give room for removing the pumping-rods from the well, a base-plate for the engine, said plate having a recess open at one side, corresponding to the recess in said shaft, and a removable section in the lower cross-head, arranged, when removed, to provide a passage corresponding to the recess in the base-plate, for the passage of the pump-rod during the lateral shifting of the base-plate, and operating mechanism carried by said base-plate, substantially as described.

17. The combination with the inner and outer well-tubes and the pumping-valves, of an adjustable foundation-rest for supporting the pumping-valves and inner well-tube, the said foundation-rest being coned and provided with a collar and collapsible spring-pressed wedges, the spring being compressible and the wedges adapted to collapse in lowering the foundation-rest, whereby the increase of weight on the foundation-rest by insertion of the inner well-tube and pumping-valves and the weight of water or oil being pumped, will force the wedges onto the cone and into firm engagement with the well-tubes, substantially as described.

18. The combination with a pump-cylinder and valves, of an adjustable foundation-rest consisting of a coned body having slots in its lower end and an internal flange at the top, tapering wedges on said coned body, a collar to which said wedges are attached, a spring for said collar and wedges, and a pin passed through the slots of the coned body and engaged in said collar, the said pin being accessible to a tool for compressing the spring to loosen and release the wedges so that the foundation-rest may be withdrawn by means of the flange at the upper end of the coned body, substantially as described.

19. The combination with a well-tube, and pump-cylinder, of a screw-threaded collar in the upper end of the pump-cylinder, and adjustable packing above the pump-cylinder and collar for preventing sediment from filling the space between the cylinder and the well-tube in which the pump-cylinder is placed, and means for compressing said packing against the well-tube and upon the pump-cylinder, substantially as described.

MATTHEW T. CHAPMAN.
MARK C. CHAPMAN.

Witnesses:
FREDERICK BROWN,
COURTNEY L. SMITH.